United States Patent Office 2,862,020
Patented Nov. 25, 1958

2,862,020

DERIVATIVES OF α-AMINO-β-HYDROXY HYDROXAMIC ACIDS

Balthasar Hegedüs, Basel, Switzerland, assignor to Hoffmann-La Roche Inc., Nutley, N. J., a corporation of New Jersey No Drawing. Application June 22, 1956
Serial No. 593,031

Claims priority, application Switzerland June 28, 1955

11 Claims. (Cl. 260—471)

This invention relates to the preparation of derivatives of α-amino-β-hydroxy acids. More particularly, the invention relates to derivatives of α-amino-β-hydroxy acids represented by the general formula

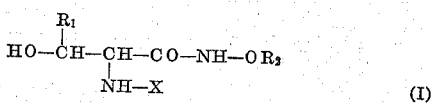

wherein $R_1$ represents hydrogren, lower alkyl, phenyl or monosubstituted phenyl, $R_2$ represents hydrogen, aralkyl or monosubstituted aralkyl and X represents a group readily removed by hydrogenolysis.

The compounds of this invention corresponding to Formula I above are prepared by reacting a compound having formula

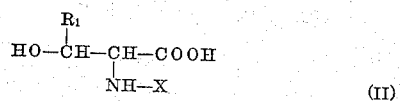

wherein $R_1$ and X have the same significance defined above with hydroxylamine or an O-ether of hydroxylamine in the presence of an agent which effects the splitting off of a molecule of water.

Lower alkyl groups represented by $R_1$ in the formulae above include methyl, ethyl, propyl, etc. Monosubstituted phenyl groups represented by $R_1$ include nuclearly substituted phenyl groups such as p-nitrophenyl, etc. Aralkyl groups represented by $R_2$ include the benzyl group and monosubstituted benzyl groups, e. g. p-nitrobenzyl. Substituents represented by X which are readily split off by hydrogenolysis include the carbobenzyloxy group, carballyloxy group and the like, that is to say, carbo-lower alkoxy groups, carbo-lower alkenoxy groups and carbaralkoxy groups. "Aralkyl" as used herein refers to monocyclic aralkyl groups wherein the "alkyl" is a lower alkylene radical. As noted above, the aralkyl groups may bear a substituent on the phenyl ring.

In addition to hydroxylamine as the agent for effecting the conversion of the α-amino-β-hydroxy acid corresponding to Formula II above, there may be used O-ethers of hydroxylamine, e. g. aralkyl or monosubstituted aralkyl ethers such as the benzyl or p-nitrobenzyl ethers and the like.

Agents which effect the splitting off of water are N,N'-disubstituted-carbodiimides such as N,N'-dicyclohexyl-carbodiimide which is the preferred dehydrating agent. The N,N'-disubstituted-carbodiimide is used in approximately molar proportion. The reaction of the acid corresponding to Formula II with hydroxylamine or O-ethers thereof is exothermic; therefore it is advantageous to cool the reaction mixture. The reaction is preferably carried out in an inert solvent, for example, tetrahydrofuran, dimethylformamide, dioxane, etc.

During the course of the reaction of the α-amino-β-hydroxy acid with the hydroxylamine or an O-ether thereof in the presence of an N,N'-disubstituted-carbodiimide, an N,N'-disubstituted-urea is formed and precipitates out. At the conclusion of the reaction the N,N'-disubstituted-urea is separated by filtration, the solvent is evaporated and the reaction product is obtained as a residue.

Preferred compounds corresponding to Formula I above are those wherein $R_1$ represents hydrogen, $R_2$ represents benzyl or nitrobenzyl and X represents carbobenzyloxy or carballyloxy. An especially preferred modification of this invention comprises dissolving an acid corresponding to Formula II, wherein $R_1$ represents hydrogen, and X represents carbobenzyloxy or carballyloxy with hydroxylamine or the O-benzyl ether thereof, in tetrahydrofuran and treating this mixture with N,N'-dicyclohexyl-carbodiimide while cooling strongly. After filtering off the N,N'-dicyclohexyl-urea which is formed in the reaction, the reaction product is readily obtained in pure form after evaporation of the solvent from the filtrate.

The new compounds of this invention are crystalline substances not readily soluble in water and rather readily soluble in organic solvents. The compounds of this invention are useful as intermediates for the synthesis of 4-amino-3-isoxazolidone or 5 - substituted-4-amino-3-isoxazolidone wherein the 5-substituent corresponds to $R_1$ of the starting material as described above. The 4-amino-3-isoxazolidones which are obtained from the compounds of this invention are antibacterial agents useful in treating infections caused by organisms such as pneumococci, E. coli, S. schottmuelleri and M. tuberculosis. The substances having the Formula I above are converted to the aforesaid 4-amino-3-isoxazolidones by esterification with an inorganic or organic acidic substance, e. g. hydrochloric acid, hydrobromic acid, trifluoroacetic acid, p-toluenesulfonyl chloride, methanesulfonyl chloride, etc., in the presence of a tertiary base such as pyridine. The ester thus obtained is subjected to catalytic hydrogenolysis, e. g. in the presence of platinum or palladium, and the hydroxamic acid formed as a result of the hydrogenolysis is cyclized by means of a basic agent such as alkali metal alcoholates, alkali metal hydroxides or pyridine.

*Example 1*

41 parts by weight of DL-1-(N-carbobenzyloxyamino)-2-hydroxypropionic acid and 21 parts by weight of O-benzylhydroxylamine were dissolved in 300 parts by volume of tetrahydrofuran. While cooling with ice and stirring, a solution of 36 parts by weight of N,N'-dicyclohexyl-carbodiimide in 50 parts by volume of tetrahydrofuran were dropped in within 10–15 minutes. The mixture was stirred for 3 hours without further cooling. The N,N'-dicyclohexylurea formed was filtered under suction and the solvent was evaporated from the filtrate in vacuo. The reaction product, 1-(N-carbobenzyloxyamino)-2-hydroxy-propionohydroxamic acid-O-benzyl ether, remained as a crystalline residue. After recrystallization from methanol, the product melted at 107–109° C.

63 parts by weight of 1-(N-carbobenzyloxyamino)-2-hydroxy-propionohydroxamic acid-O-benzyl ether were dissolved in 300 parts by volume of pyridine and, while cooling with ice water, the solution was treated portionwise with 36 parts by weight of p-toluenesulfonyl chloride. The mixture was permitted to stand in the refrigerator overnight, then poured into 3 liters of 3 N sulfuric acid and extracted with methylene chloride.

The methylene chloride solution was washed several times with dilute sulfuric acid and sodium bicarbonate solution, dried over sodium sulfate and concentrated in vacuo. The residual oil was dissolved in 120 parts by volume of warm absolute ethanol and the solution was treated with petroleum ether until slightly turbid, whereupon the 1-(N-carbobenzyloxyamino)-2-p-toluenesulfonyloxy)-propionohydroxamic acid-O-benzyl ether crystallized. After recrystallization from ethanol and petroleum ether, the product melted at 103–106° C.

5 parts by weight of the product obtained above were suspended in 300 parts by volume of ethanol and hydrogenated in the presence of palladium metal. After the absorption of 2 mols of hydrogen, the hydrogenation slowed down considerably. The catalyst was separated by filtration, the filtrate was evaporated to small volume in vacuo and a solution of 0.9 part by weight of sodium methylate in 20 parts by volume of ethanol were added. Sodium p-toluenesulfonate precipitated at once. The mixture was warmed 5 to 10 minutes on a steam bath and filtered under suction. The filtrate was evaporated in vacuo and the residue was dissolved in water. By passing the solution through a cation exchange column (Amberlite IR-120, a polystyrene nuclear sulfonic acid resin, produced as described in U. S. Patent No. 2,366,007, commercially available from Rohm and Haas Co., Philadelphia, Pa.), the 4-amino-3-isoxazolidone was absorbed and then eluted with 0.2 N ammonia solution. The solution was evaporated to small volume, adjusted to pH 5 to 6 with dilute acetic acid and precipitated with isopropanol. The 4-amino-3-isoxazolidone was thus obtained in pure form, M. P. 130–135° C. (with dec.).

*Example 2*

46.1 parts by weight of DL-1-(N-carbobenzyloxyamino)-2-hydroxybutyric acid (a viscous light yellow oil produced by carbobenzyloxylating 1-amino-2-hydroxybutyric acid, e. g. with carbobenzyloxy chloride in solution made alkaline with soda) and 22.4 parts by weight of O-benzylhydroxylamine were dissolved in 150 parts by volume of tetrahydrofuran. While cooling with ice and stirring, 37.7 parts by weight of N,N'-dicyclohexyl-carbodiimide dissolved in a little tetrahydrofuran were dropped in. After all of the diimide had been dropped in, the mixture was stirred for an additional 2 to 3 hours at room temperature. The N,N'-dicyclohexylurea which formed was separated by filtering under suction and the filtrate was evaporated to dryness in vacuo. The oil remaining was dissolved in 200 to 300 parts by volume of ether and cooled in ice water. The DL-1-(N-carbobenzyloxyamino)-2-hydroxy-butyro hydroxamic acid-O-benzyl ether which formed soon began to separate as a gelatinous mass. The mixture was permitted to stand overnight in a refrigerator, then filtered under suction. The residue was purified by crystallization from 250 parts by volume of toluene, M. P. 92–95° C.

*Example 3*

50 parts by weight of 1-(N-carbobenzyloxyamino)-2-hydroxy-2-phenylpropionic acid (produced by carbobenzyloxylating 1-amino-2-hydroxy-2-phenylpropionic acid, e. g. with carbobenzyloxy chloride, in solution made alkaline with soda, then crystallized from carbon tetrachloride, M. P. 94–96° C.) and 19.5 parts by weight of O-benzylhydroxylamine were dissolved in 300 parts by volume of tetrahydrofuran. While cooling with ice and stirring, 32.7 parts by weight of N,N'-cyclohexyl-carbodiimide mixed with a little tetrahydrofuran were dropped in. After dropping in the diimide, the mixture was stirred for an additional 2–3 hours at room temperature. The N,N'-dicyclohexyl-urea formed was separated by filtration and the filtrate was evaporated to dryness in vacuo. The crystalline residue was made into a paste with ether, filtered under suction and washed with ether and petroleum ether. The 1-(N-carbobenzyloxyamino)-2-hydroxy-2-phenyl-propionohydroxamic acid-O-benzyl ether, after crystallization from toluene, melted at 160–163° C.

I claim:

1. A process for producing a compound represented by the formula

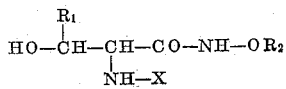

wherein $R_1$ represents a member of the group consisting of hydrogen, lower alkyl, phenyl and nitrophenyl, $R_2$ represents a member of the group consisting of hydrogen, aralkyl and nitroaralkyl and X represents a member of the group consisting of carbo-lower alkoxy, carbo-lower alkenoxy and carbaralkoxy which comprises reacting an acid represented by the formula

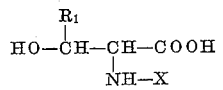

wherein $R_1$ and X have the same significance defined above with a member of the group consisting of hydroxylamine, hydroxylamine-O-aralkyl ether and hydroxylamine-O-nitroaralkyl ether in the presence of a carbodiimide.

2. A process which comprises reacting 1-(N-carbobenzyloxyamino)-2-hydroxypropionic acid with O-benzylhydroxylamine in the presence of a carbodiimide.

3. A process which comprises reacting 1-(N-carbobenzyloxyamino)-2-hydroxypropionic acid with O-benzylhydroxylamine in the presence of N,N'-dicyclohexylcarbodiimide.

4. A process which comprises reacting 1-(N-carbobenzyloxyamino)-2-hydroxybutyric acid with O-benzylhydroxylamine in the presence of a carbodiimide.

5. A process which comprises reacting 1-(N-carbobenzyloxyamino)-2-hydroxyphenylpropionic acid with O-benzylhydroxylamine in the presence of a carbodiimide.

6. A process which comprises reacting 1-(N-carbobenzyloxyamino)-2-hydroxy-2-p-nitrophenylpropionic acid with O-benzylhydroxylamine in the presence of a carbodiimide.

7. A process which comprises reacting, while cooling, 1-(N-carbobenzyloxyamino)-2-hydroxy-propionic acid with O-benzylhydroxylamine in tetrahydrofuran in the presence of N,N'-dicyclohexyl-carbodiimide.

8. A compound represented by the formula

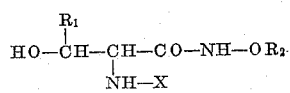

wherein $R_1$ represents a member of the group consisting of hydrogen, lower alkyl, phenyl and nitrophenyl, $R_2$ represents a member of the group consisting of aralkyl and nitroaralkyl and X represents a member of the group consisting of carbo-lower alkoxy, carbo-lower alkenoxy and carbaralkoxy.

9. 1-(N-carbobenzyloxyamino)-2-hydroxy-propionohydroxamic acid-O-benzyl ether.

10. 1-(N-carbobenzyloxyamino)-2-hydroxy-butyrohydroxamic acid-O-benzyl ether.

11. 1-(N-carbobenzyloxyamino)-2-hydroxy-2-phenyl-propionohydroxamic acid-O-benzyl ether.

References Cited in the file of this patent

UNITED STATES PATENTS 2,489,881    Harris et al.    Nov. 29, 1949
2,542,812    Hartung    Feb. 20, 1951

OTHER REFERENCES

Hickinbottom: "Reactions of Organic Compounds," p. 230 (1948).

Kuehl et al.: J. Am. Chem. Soc., 77, 2344 to 2347 (1955).